Sept. 22, 1936.　　　　　　　E. S. BUSH　　　　　　　2,054,806
ELECTROMAGNETIC CONTROL DEVICE
Original Filed Feb. 4, 1935　　　2 Sheets—Sheet 1
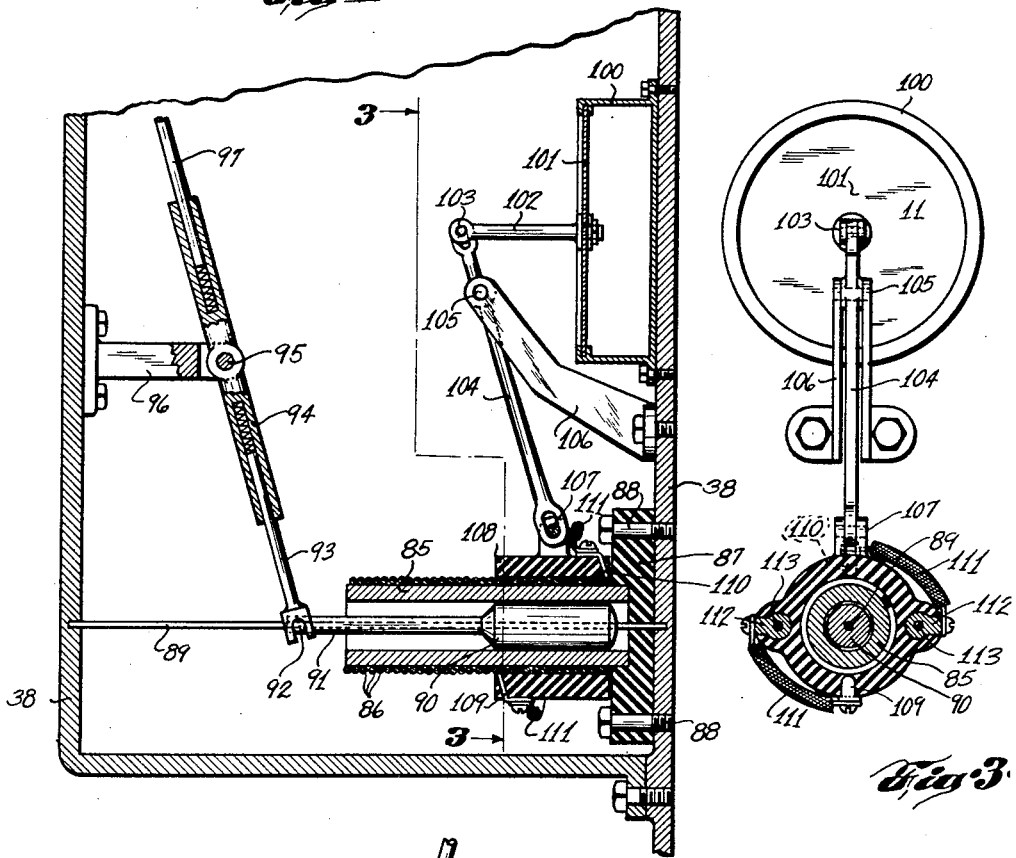
INVENTOR.
EUGENE S. BUSH
BY Robert B. Terry
ATTORNEY.

Sept. 22, 1936.  E. S. BUSH  2,054,806
ELECTROMAGNETIC CONTROL DEVICE
Original Filed Feb. 4, 1935  2 Sheets-Sheet 2
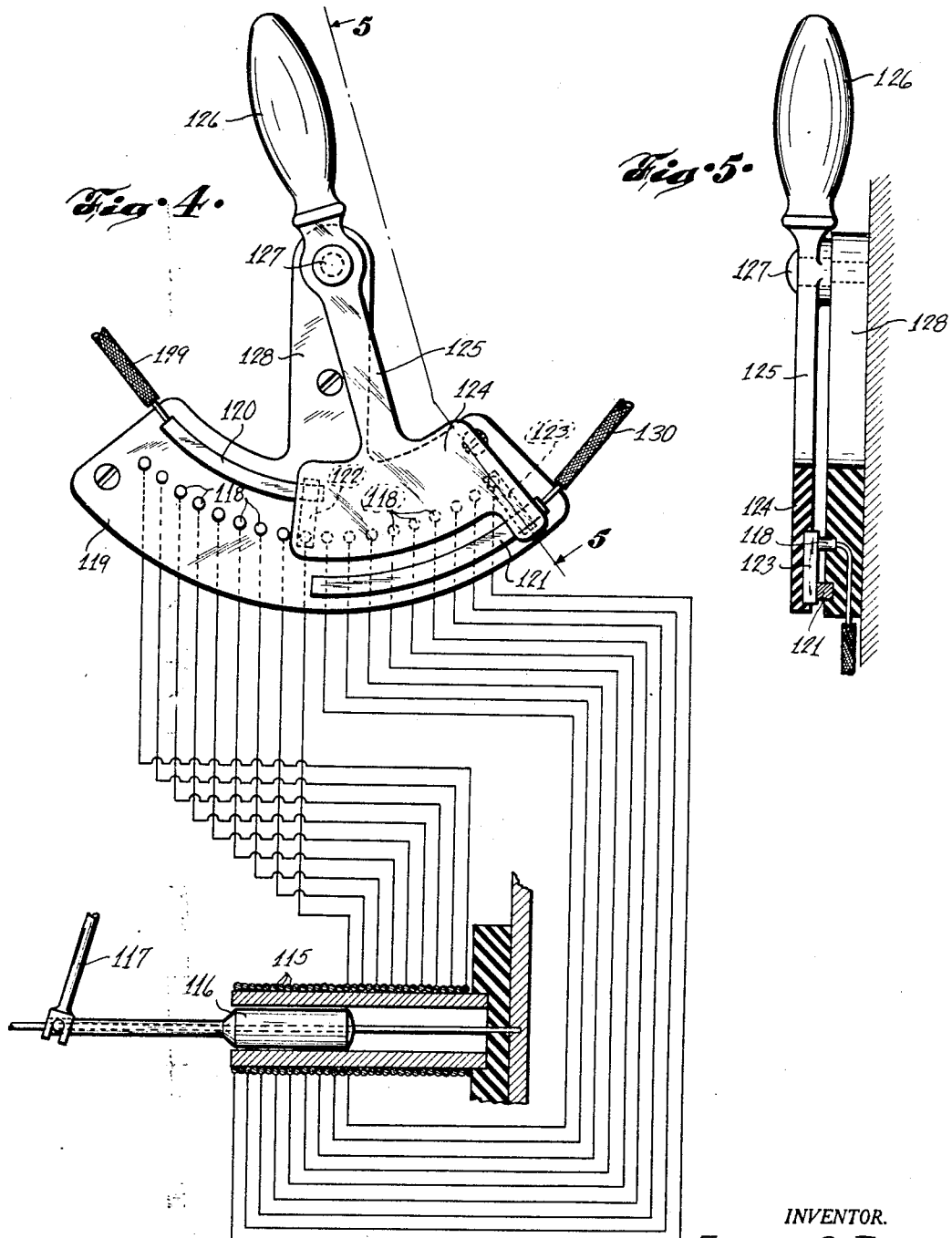
INVENTOR.
EUGENE S. BUSH
BY Robert B. Terry
ATTORNEY.

Patented Sept. 22, 1936

2,054,806

UNITED STATES PATENT OFFICE 2,054,806

ELECTROMAGNETIC CONTROL DEVICE

Eugene S. Bush, St. Louis, Mo., assignor to Bush Manufacturing Company, St. Louis, Mo., a corporation of Missouri Original application February 4, 1935, Serial No. 4,742. Divided and this application August 22, 1935, Serial No. 37,382

8 Claims. (Cl. 175—335)

This invention relates to improvements in electromagnetic control devices, and particularly to an assembly enabling the utilization of a source of electromagnetic energy intervening either a facultative or automatic control, and the apparatus or organization to be controlled thereby.

In many types of automatically or manually controlled mechanism it is desirable to interpose a source of energy for effecting movement of a controlled member, even though such member be subject to operator-control as through a key, switch, drum controller, wheel, lever or the like. Since the possibilities of application and adaptation of the present subject matter are such as to render inexpedient any attempted complete enumeration thereof, it may be noted that the example selected for purposes of disclosure comprises an electromagnetic unit designed for the control of a variable speed aircraft supercharger drive, and serves to connect in functional association with the speed-change organization, an automatic barometric control organization. The present application constitutes a division of my co-pending application, Serial No. 4,742, filed February 4, 1935, wherein there is fully disclosed an arrangement embodying the presently claimed features for translating a barometrically effected control movement of small range, to a speed-change organization connecting an aircraft engine with an associated supercharger. This combination embodying the present subject matter is, however, not to be construed as restrictive of application of the present subject matter.

An object of the invention, generally stated, is the provision of an electromagnetic device capable of translating a comparatively effortless control movement, to a regulating movement characterized by requisite range and energy for actuating associated control apparatus.

Another object of the invention is attained in a device of the order described, wherein a great, or substantially infinite number of different control positions may be attained within the range of actuation of a reciprocable control element.

A still further object of the invention is attained in a novel combination of armature and coil elements of an electromagnetic device such that a substantially infinite number of flux zones may be selectively energized, and so provide a large number of different possible placements of a control-actuating armature, between end limits of its movement.

Yet another object of the invention is attained in an arrangement including a control-actuating electromagnet embodying provisions whereby an armature of the electromagnet is selectively positionable in substantially any desired zone within its defined path of actuation, and is so movable at a controlled rate, in either direction, and by a smooth, gradual, orderly motion.

In the drawings, Fig. 1 is a vertical sectional elevation of a selected embodiment which includes a barometric control device mechanically coupled with an electromagnet embodying features of the present invention, and connected in turn to a member to be controlled thereby; Fig. 2 is a vertical section of a portion of the structure appearing in Fig. 1, but showing the armature and control elements in a position opposite to that appearing in Fig. 1; Fig. 3 is a sectional elevation taken along a vertical staggered plane represented by line 3—3 of Fig. 1; Fig. 4 is a sectional elevation, partly diagrammatic, showing a modification of the device when employed as an operating agency intervening a manual control and an organization to be regulated or governed thereby, and Fig. 5 is a sectional elevation taken along line 5—5 of Fig. 4.

In describing the parts and functions of the structure presently illustrated, reference numerals are employed which correspond to those utilized in the parent application of which the present is a division, this identity of numerals conducing to ease of correlation of the subject matter of the two applications.

While in the exemplary embodiment constituting the subject matter of the noted application of Serial No. 4,742, it is entirely feasible to utilize a direct connection from a barometric control agency to a variable speed transmission, for control thereof, nevertheless in the interest of economizing in space, or because of other restrictions, it is usually desirable that there be operatively interposed in the control system, an independent source of energy. This is exemplified according to the structure shown by Fig. 1, in the use of an electromagnetic device consisting of a solenoid having a tubular core 85 upon which is wound the number of ampere-turns of conductor 86, requisite to provide the desired flux. The core 85 is supported at one end as by a fibre or other insulating block 87, detachably secured as by cap screws 88 to a wall of an enclosure or case 38. A rod 89 serves as a guide for slidably receiving the movable core or armature 90 of the solenoid, and preferably serves to keep the core free of the inner surface of core 85, the armature being provided with a tubular extension 91, carrying trunnions 92 engaged by a forked end of a control rod 93, this rod being telescopically received by a hollow end of a lever 94 pivoted at 95 to a stationary bracket 96. At the opposite end of the pivoted element 94, is telescopically received an arm 97 which operatively connects with the apparatus to be regulated, shifted or controlled through the agency of the electromagnetic assembly. According to Figs. 1 and 3, an aneroid casing 100, provided with a displaceable outer wall in the nature of a diaphragm 101, is mounted on a vertical wall of the case 38, the diaphragm 101 being connected through a post 102 and a pivoted slot-and-pin connection 103 to a lever 104. This member is so pivoted at 105 to a stationary arm 106, that the short end of the lever is connected to the diaphragm. The opposite end pivotally engages, through a slot-and-pin connection 107, a contact slide 108, the slide being movable from end to end of the wound length of the solenoid.

The slide 108 serves to carry a pair of diametrally opposed and endwise spaced contacts 109 and 110, which directly engage bared portions of the winding 86. Contacts 109—110 are energized through conductors 111, each secured at its opposite end to a binding post 112, the posts being in sliding circuit relation with conductor rods 113 connected to a suitable source of supply (not shown). The rods 113 are conveniently mounted along and laterally of the coil, so as guidingly to support the insulating body constituting the slide element 108.

From the foregoing it will appear that the solenoid may be of constantly-energized type, and that any selected zone of the coil may be energized, which zone is of an axial length equivalent to the longitudinal distance between the contacts 109 and 110. It will further be seen that outward movement of the diaphragm 101 will operate through lever 104 to move the slide 108, and hence the armature or core, to the right (Fig. 1) and in a direction to move the actuated control, as by the lever end 97, to the left. Obviously the core 90 may be connected directly to the actuated control element, which will accordingly move in the same direction as the armature or core. It will also be understood that the armature or core 90 will follow the movement of the lower end of rod 104 which determines the zone of energization of the electromagnet in a manner to provide, between limits, a practically infinite number of different control placements of the arm 97; further that practically any movement of the diaphragm 101 will result in a corresponding although multiplied movement of slide 108 and hence of armature or core 90.

A slightly modified agency for control of the solenoid is shown by Figs. 4 and 5, in connection with a manual switching arrangement. In this structure the proximate turns of the winding 115 are not directly engaged by a contact slide, but may be progressively energized in selective grouping for shifting the position of the armature 116 and the control arm 117 by a remote control agency. The several turns of conductor in proximate zones of the coil are connected in sequence to a row or series of stationary contacts 118, the connections from these button contacts being made on one or the left hand end (Fig. 5) of a stationary spider 119 to turns near the right hand end of the coil, while those on the right hand end of the quadrant or spider are connected to turns toward the opposite end of the solenoid core. The quadrant 119 serves to carry a pair of spaced arcuate contacts 120 and 121, the former being engaged by a brush 122, and the latter by a brush 123 carried by an insulating portion 124 of an in-completely rotatable lever 125. The lever is shown as actuated by a control handle 126, pivoted at 127 to an extension 128 of the spider 119. The arcuate contacts 120 and 121 are connected through conductors 129 and 130 respectively, to a source (not shown) of electrical energy.

As will appear from Fig. 4, the course of the current may be followed, for example, from conductor 129 through the arcuate strip 120 and brush 122, through one of the buttons 118 into the core; from an opposite spaced turn or winding of the electromagnet the current is returned through a spaced button contact 118, thence through brush 123 to contact 121 and out through conductor 130. From this it will appear that movement of the lever 125, as by handle 126, will cause a progressive energization of the turns 115 of the solenoid in proximate but overlapping zones thereof, so that the core or armature 116 and hence the lever 117, will be given a movement directly following that of the lever 125, although obviously the movement of the core 116 may be effected through a different or much greater range. The arrangement is such that, by using a sufficient number of turns 115 and a sufficient number of the fixed contacts 118, the core may practically be considered as positionable in any zone between the end limits of its movement; otherwise expressed, the arrangement as employed for the control of an assembly requiring a great number of different control settings, is susceptible of a practically infinite number of different control placements. Although the arrangement of Figs. 4 and 5 is shown as manually controlled, the lever 125 may be replaced by an automatic control system such as shown by Fig. 1, wherein the lever 104 would be substituted for lever 125, in a manner not requiring illustration or directions.

There have been known heretofore certain electromagnetic devices in which are employed a plurality of separately energizable coils or windings arranged magnetically to influence a common armature. As far as I am aware however, such devices are characterized by a plurality of separately energizable zones, each of a length at least approximating, and in most cases exceeding, the length of the armature influenced thereby. It results from these older arrangements that the armature must be characterized, in operation, by a distinct step-by-step actuation, or a movement by stages, conducing to a jerky motion of the armature and hence of the organization controlled thereby. It is to be noted that in the present example, the energized zones of the coil assembly are susceptible of being shifted through a distance equal only to a fraction of the axial length of the armature. It results from this improvement that the armature need not be moved through a distance anywhere near approximating its length; further, that the number of different zones of possible placement of the armature is substantially infinite, and that such zones of placement, reckoned in respect to the length of armature, are distinctly overlapping.

Even though, as is contemplated and has been successfully practiced, the device of the present disclosure be employed for actuation of the armature from one end to the other of its full range of movement, such actuation will proceed smoothly and in orderly fashion and at a controlled rate over the entire range, and will not be characterized by any perceptible stages or steps of movement as in certain of the older forms of electromagnetic actuating devices.

The noted advantages of the present improvements are particularly evident in case the device is utilized for actuation of registering or recording apparatus, wherein the range of personal control movement may be exceedingly small, or wherein the armature may be required to be actuated smoothly, but without proceeding by stages, through its entire range or a substantial part thereof.

It will be understood that, in the interest of brevity, only a few of the many possible embodiments of the electromagnetic control device are illustrated and described. For this reason it may be noted that, for example, the member 102 may be considered as a manually operable member and so utilized simply by disconnection from the diaphragm 101 so that the remaining elements of the assembly may be considered as adaptable either to, say a fluid-pressure control or some other form of automatic governing device, or may be utilized as a manually controlled agency. In a similar manner the arrangement shown by Figs. 4 and 5, may obviously be so embodied that the hand lever 126 is subjected to a fluid pressure or other form of automatic control wherein the movement of the switch arm 125 will have exactly the same function in effecting control movement of the armature 116 and lever 117 as would be the case were it subjected to a strictly manual movement.

Assuming the coil to contain the requisite number of ampere turns, the armature will always follow the zone of energization in such manner that some part of the armature is within some part of the flux zone, thus attaining a smoothness and control of rate of actuation not possible with older devices. It will further appear that the armature, in following the shift of flux zone, will practically instantly, without lag, cause the controlled elements to follow the shift of lever 104 or 126, and in all respects fully attain the several objects above noted.

While the invention has been described by reference to certain exemplary embodiments thereof, the foregoing is to be understood solely in a descriptive and not in a limiting sense, since numerous changes may be made in the parts, their arrangement and their combinations, without departing from the full intended scope of the invention as defined by the claims hereunto appended.

I claim:

1. An electromagnetic device for actuation of a control element of a type to be disposed in any position between limits of movement, said device including a coil, and a control actuating member, an electromagnet including an armature operatively connected to said control element, a contact slide movable in engagement with the turns of the coil, that the armature thereof is movable responsively to any appreciable movement of the slide, a guide for the armature, serving for the support thereof independently of the coil structure, a pair of rigid conductor elements extending lengthwise of the coil and exteriorly thereof, the contact slide being supported by said elements, and conductors connected to said elements, coacting therewith and with the contact slide for energizing the coil.

2. An electromagnetic control-actuating assembly including an electromagnet composed of a series of axially adjacent, selectively energizable turns of conductor constituting the winding of a coil, an armature within the coil, means for energizing the coil turns, including a contact slide movable in engagement with the coil turns, a guide and supporting structure for the slide, externally of the coil, and a guide for the armature extending within the coil.

3. An electromagnetic control-actuating assembly including an electromagnet composed of a series of axially adjacent, selectively energizable coils, an armature, a substantially rigid guide element on which the armature is slidably mounted, and arranged for support independently of the coil structure, a slidable contact member movable over, and arranged for so energizing the coils, as selectively to move the armature through a distance substantially less than its dimension axially of the electromagnet.

4. In an electromagnet of a type adapted for effecting movement of a control element to any position between prescribed limits, an armature, and a coil structure of the electromagnet having its turns exposed in part, so as to enable selective energization thereof, a contact member slidably mounted for movement over the exposed portions of the coil turns, means for selectively energizing the coil turns through the contact member, and means for moving the contact member into any position along the coil, so that the armature may occupy any of a substantial number of different overlapping zones within the electromagnet.

5. In an electromagnetic control actuating assembly, a coil structure having a passage therethrough, an armature operable in the passage and having a bore therethrough, connections to the windings of the coil structure to provide a substantial number of individually energizable zones of the coil structure, with the zones of such axial extent and so located that the armature bridges a plurality of said zones when in any of a number of different positions within the said passage, a guide rod extending through the coil passage and armature bore, for guidingly supporting the armature independently of the coil structure.

6. In an electromagnetic control actuating assembly, a coil structure having a passage therethrough, an armature operable in the passage, a passage through the armature, connections to the windings of the coil structure to provide a substantial number of individually energizable zones of the coil structure, with the zones each of such axial extent and so located that the armature bridges a plurality of said zones when in any of a number of different positions within the said passage, a guide for the armature extending therealong, and engaged by the passage-forming portion of the armature for support thereof, independently of the coil structure, and an operative connection from the armature to a controlled member, independent of the guide.

7. In an electromagnetic control-actuating assembly, a coil structure having a passage therethrough, conductors adapted for connection to the coil, providing a constant-length zone of energization of the coil substantially less than the axial length of the coil, and means including a slidable contact member associated with said conductors, arranged for shifting the zone of energization a distance substantially less than its length, thus providing a substantial number of placements of said zone of energization, and an armature operable within said passage, and of a length at least equal to that of the zone of energization.

8. In an electromagnetic control-actuating assembly, a coil structure having a passage therethrough, conductors adapted for electrical connection to substantially adjacent turns of the winding of the coil structure, a slidable contact member associated with said conductors, and coacting therewith to provide a shiftable, constant-length zone of energization of the coil, the axial length of which is substantially less than that of the coil, the contact member and conductors being arranged, responsively to movement of the contact member, to shift the zone of energization a distance substantially less than its length, and into a substantially infinite number of placements along the coil, and an armature operable within said passage, and of an axial length exceeding that of the said zone of energization.

EUGENE S. BUSH.